United States Patent Office 3,819,730
Patented June 25, 1974

---

3,819,730
PROCESS FOR DICHLOROBUTENE ISOMERIZATION
Bruce Tadashi Nakata and Eugene Dennis Wilhoit, Victoria, Tex., assignors to E. I. du Pont de Nemours and Company, Wilmington, Del.
No Drawing. Filed Nov. 30, 1971, Ser. No. 203,476
Int. Cl. C07c 21/04
U.S. Cl. 260—654 R          6 Claims

ABSTRACT OF THE DISCLOSURE

An improved process for the isomerization of 1,4-dichlorobutene-2 to 3,4-dichlorobutene-1, or vice versa, by heating the butene compound in the presence of a copper salt complexed with an organic quaternary ammonium compound.

BACKGROUND OF THE INVENTION

This invention concerns an improved process for the isomerization of 1,4-dichlorobutene-2 to 3,4-dichlorobutene-1 or vice versa.

It is known in the art to isomerize 3,4-dichlorobutene-1 to 1,4-dichlorobutene-2 by heating the compound in the presence of a metal chloride such as iron chloride, tin chloride, zinc chloride and the like (U.S. Pat. 2,242,084). Description of isomerization of dichlorobutene in the presence of cuprous chloride combined with amine is found in British 798,889; with amine hydrochloride is found in French 2,020,235; and with selected carboxylic acid amides and lactams is found in British 1,222,226. Also described in the art is the isomerization of 1,4-dichlorobutene-2 to 3,4-dichlorobutene-1 by heating the 1,4- compound in the presence of a complexed metal such as the palladium chloride-benzonitrile complex (Japanese No. 3,613/57) or cuprous chloride complexed with benzonitrile or with adiponitrile (U.S. Pat. 3,515,760).

A shortcoming particularly attending the use of the complexes referred to above for the isomerization reactions is the accumulation of nonvolatile or high-boiling by-products among the reaction products. Accordingly, a process for the isomerization of the dichlorobutene free of the above-mentioned deficiencies is desired.

SUMMARY OF THE INVENTION

The present invention is based on the discovery of a new catalyst system which permits isomerization of the dichlorobutenes to proceed rapidly and in high yield, with only minor quantities of nonvolatile or high-boiling by-products. The new catalyst system comprises an organic quaternary ammonium chloride in combination with cuprous chloride, in molar ratio ranging from about 0.5 to about 1.8, preferably 0.6 to 1.1. The resulting complex is soluble in the dichlorobutene over a wide temperature range and thus affords a homogeneous reaction mixture without the use of solvents.

The organic quaternary ammonium chloride has the formula $R_nR'_mNCl$ wherein R is an aryl radical, an alkyl radical having 4–10 carbon atoms or a chlorine substituted butenyl radical, R' is an alkyl radical of 1–3 carbon atoms, $n+m=4$ and $n$ has a value of 0 on 1. Aryl radicals include phenyl, benzyl, xylyl, tolyl and naphthyl; alkyl radicals include methyl, ethyl, propyl, butyl, pentyl, hexyl, heptyl and the like. Preferred organic quaternary ammonium chlorides include butyltrimethylammonium chloride, benzyltrimethylammonium chloride, and quaternary ammonium salts derived from 1,4-dichlorobutene-2 or 3,4-dichlorobutene-1 and trimethyl amine or triethyl amine such as, for example, 4-chloro-2-butenyl-triethylammonium chloride or 4-chloro-2-butenyl-trimethylammonium chloride. The concentration of the catalyst system used in the isomerization can be in the range of 0.1 to 30% by weight based on the weight of the dichlorobutene, and on a cuprous chloride equivalent basis preferably in the range of 1–15% by weight. The catalyst system can be preformed and then introduced to the dichlorobutene or it can be generated from the appropriate amine and dichlorobutene in the reactor.

The isomerization can be carried out over a temperature range in which the reaction mixture remains homogeneous, that is, above the solution temperature of the catalyst system in dichlorobutene. A generally operable range is from about 30° C. to about 150° C. and preferably in the range of 60 to 120° C. The isomerizations can be carried out over a range of pressures from subatmospheric to superatmospheric and preferably from about 50 to about 300 mm. of mercury. The process is applicable to both batch and continuous operations.

In a general description of the process, substantially pure 1,4-dichlorobutene-2 or 3,4-dichlorobutene-1 or a mixture of the butenes is fed to a constant boiling reactor operating under reduced pressure and containing the cuprous chloride/quaternary ammonium chloride catalyst system. The isomerized dichlorobutene compound (a mixture of 1,4- and 3,4-isomers) is taken off as a vapor, then condensed, and subsequently fractionally distilled to yield substantially pure 3,4- and 1,4-dichlorobutene, respectively. The cuprous chloride/quaternary ammonium chloride is normally prepared separately in hot dichlorobutene solution and charged to the reactor prior to process startup. The reaction products are determined by gas chromatography.

The products of the isomerization reaction, 3,4-dichlorobutene-1 or 1,4-dichlorobutene-2, are useful as intermediates in the manufacture of chloroprene synthetic rubber and in the manufacture of polyamides.

DESCRIPTION OF PREFERRED EMBODIMENTS

The invention is more fully illustrated in the examples to follow. Examples 1, 2, 3 and 4 illustrate the lower quantities of nonvolatile by-products obtained in the process of this invention as compared with the process of the prior art (Example 5). Examples 6 and 7, describing continuous dichlorobutene isomerizations, illustrate the excellent catalyst life and productivity of the cuprous chloride/organic quaternary ammonium chloride catalyst system in the isomerization of the dichlorobutene. The following designations are used: 3,4-DCB=3,4-dichlorobutene-1; 1,4-DCB=1,4-dichlorobutene-2.

EXAMPLE 1

To a nitrogen swept, stirred 500 ml. reaction flask equipped with a watercooled reflux condenser were charged 22.9 g. butyltrimethylammonium chloride, 15.0 g. cuprous chloride, and 300.0 g. dichlorobutene (mainly 3,4-DCB). The mixture was heated to 105° C. and held at this temperature for 9.2 days. At the end of this time, an aliquot (29.46 g.) of the reaction mixture was filtered hot (105° C.) for solids. Another aliquot (104.1 g.) was distilled under high vacuum for nonvolatile high boiling products. The results of these analyses, expressed in terms of generation rate (i.e., percent of reactor contents per day) were as follows: Solids—0.2%/day; High Boilers: 0.7%/day. The dichlorobutene composition is typically about 20% 3,4-dichlorobutene-1/80% 1,4-dichlorobutene-2.

EXAMPLE 2

This example shows that air does not aggravate nonvolatile by-products generation in cuprous chloride/ organic quaternary ammonium chloride catalyzed dichlorobutene isomerization. Example 1 was repeated employing an air purge to the reactor vapor space in place of the nitrogen sweep used and using predominantly 1,4-DCB as the dichlorobutene. The reaction mixture was analyzed for solids and high boilers as described in Example 1 after 4.5 days of holdup at 105° C. The results of the analyses were as follows: Solids—0.2%/day; High Boilers—0.3%/day. Typical dichlorobutene composition of the product is as described in Example 1.

EXAMPLE 3

To a nitrogen swept, stirred 500 ml. reaction flask was charged 300 g. dichlorobutene (1,4-DCB) and 7.86 g. triethylamine. The quaternary salt, 4-chloro-2-butenyl triethylammonium chloride, was allowed to form and then 7.69 g. cuprous chloride was added to the quaternary ammonium chloride/dichlorobutene slurry. The resultant homogeneous mixture was heated to 105° C. and maintained at this temperature under a nitrogen blanket for 5.0 days. At the end of this time, the reaction mixture was analyzed for solids and high boilers as described in Example 1. The results of these analyses were as follows: Solids—0.006%/day; High Boilers—1.1%/day.

EXAMPLE 4

To a nitrogen swept, stirred 500 ml. flask equipped with a watercooled reflux condenser and cooled to ~ −10° C. were charged 359 g. dichlorobutene (1,4-DCB) and 4.59 g. trimethylamine. The quaternary salt, 4-chloro-2-butenyl-trimethylammonium chloride, was allowed to form and the flask was warmed to room temperature. Cuprous chloride, 7.69 g., was then added to the quaternary ammonium chloride/dichlorobutene slurry.

The flask was then placed under a vacuum distillation unit and 59 g. of dichlorobutene stripped from the reaction mixture. After this was accomplished, the flask was placed under a reflux condenser and heated to 105° C. The reaction mixture was held at this temperature, under a nitrogen blanket, for 2.9 days. At the end of this time, the reaction mixture was analyzed for solids and high boilers as described in Example 1. The results of these analyses were as follows: Solids—0.17%/day; High Boilers—2.61%/day.

EXAMPLE 5

This example shows the greater solids and high boilers generation rates in cuprous chloride/adiponitrile catalyzed dichlorobutene isomerization (relative to cuprous chloride/quaternary ammonium chloride catalyzed isomerization). To a nitrogen swept, stirred 500 ml. flask equipped with a reflux condenser were charged 90.5 g. adiponitrile, 210 g. dichlorobutene (3,4-DCB) and 7.5 g. cuprous chloride. The reaction mixture was heated to 105° C. and held at this temperature for 9.2 days under a nitrogen atmosphere. At the end of this time, the whole sample was analyzed for total nonvolatile by-products generation via vacuum distillation. The result of this analysis was as follows: Total Solids and High Boilers—4.45%/day.

EXAMPLES 6, 7

(Continuous Dichlorobutene Isomerization)

The excellent catalyst life and productivity of cuprous chloride/organic quaternary ammonium chloride system in isomerizing dichlorobutene is illustrated in these examples.

EXAMPLE 6

A 500 ml. still pot was charged with 5.0 g. cuprous chloride and 7.7 g. butyltrimethylammonium chloride and attached to a total take off distillation unit. A pressure of 130 mm. of mercury was established and heat was applied to the still pot to melt the catalyst mixture. 1,4-Dichlorobutene-2 was added to pot to the 100 ml. mark through a feed buret attached to a side-arm of the still pot. Reflux was established in the pot (approx. 100° C.) and isomerized dichlorobutene was taken overhead at the rate of 200 ml./hr. and 1,4-dichlorobutene-2 feed was added at 200 ml./hr. to maintain a 100 ml. pot level at all times. The run was operated in approximately 16-hour shifts for 4 days. Total operation time was 56.4 hours. Analyses of 10 ml. samples of product at various intervals in the run showed the composition noted below, indicating a constant catalyst life on the run.

| | Percent of— | | |
|---|---|---|---|
| Hours into run | 3,4-DCB | cis-1,4-DCB | trans-1,4-DCB |
| 0 | 1.4 | 16.8 | 81.8 |
| 0.5 | 42.5 | 13.5 | 44.0 |
| 56.4 | 45.2 | 13.1 | 41.7 |

EXAMPLE 7

A 500 ml. still pot was charged with 150 ml. of 1,4-dichlorobutene-2 and 3.16 g. triethylamine. The quaternary salt, 4-chloro-2-butenyltriethylammonium chloride, was allowed to form after which 3.10 g. cuprous choride was added to the quaternary ammonium chloride/dichlorobutene slurry. The still pot was attached to a total take off vacuum distillation unit and a pressure of 130 mm. was established and heat applied to the still pot. Reflux was established and dichlorobutene was taken overhead until the 100 ml. level was achieved in the still pot. 1,4-Dichlorobutene-2 feed to the pot was then initiated at a rate of 200 ml./hour and isomerized dichlorobutene was taken overhead at the same rate. A pot level of 100 ml. was maintained throughout the run. The run was operated continuously for 111 hours. Analyses of 200 ml. samples at various intervals in the run showed the following composition:

| | Percent of— | | |
|---|---|---|---|
| Hours into run | 3,4-DCB | cis-1,4-DCB | trans-1,4-DCB |
| 0 | 1.6 | 14.7 | 83.7 |
| 45 | 37.2 | 12.8 | 50.0 |
| 87 | 37.3 | 14.0 | 48.6 |
| 111 | 37.0 | 13.0 | 49.9 |

What is claimed is:

1. A process for isomerization of a dichlorobutene of the group consisting of 1,4-dichlorobutene-2 and 3,4-dichlorobutene-1 to its allylic isomer which comprises contacting at a temperature in the range of about 30° C. to about 150° C. the dichlorobutene with from 0.1 to 30% by weight, based on the weight of the dichlorobutene, of a catalyst complex of cuprous chloride with an organic quaternary ammonium chloride of the formula

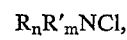

wherein R is an aryl radical of the group consisting of phenyl, benzyl, xylyl, tolyl, and naphthyl, an alkyl radical having from 4–10 carbon atoms or a chlorine-substituted butenyl radical, and R' is an alkyl group having 1–3 carbon atoms wherein $n+m=4$ and $n$ has a value of 0 or 1, the molar ratio of quaternary ammonium chloride to cuprous chloride being in the range of about 0.5 to about 1.8, and recovering the isomerized dichlorobutene.

2. The process of Claim 1 wherein the isomerization is carried out in the temperature range of 60–120° C.

3. The process of claim 2 wherein the isomerization is carried out under a pressure of about 50 to about 300 mm. of mercury.

4. The process of claim 3 wherein the concentration of the catalyst complex is in the range of one to 15 percent by weight, based on the weight of dichlorobutene, and the molar ratio of quaternary ammonium chloride to cuprous chloride is in the range of 0.6 to 1.1.

5. The process of claim 4 wherein the organic quaternary ammonium chloride is of the group consisting of butyltrimethylammonium chloride, benzyltrimethylammonium chloride, chlorobutenyltrimethylammonium chloride, and chlorobutenyl-triethylammonium chloride.

6. The process of claim 5 wherein the organic quaternary compound is 4-chloro-2-butenyl triethylammonium chloride.

References Cited

FOREIGN PATENTS

| | | | |
|---|---|---|---|
| 2,020,235 | 7/1970 | France | 260—654 R |
| 798,889 | 7/1958 | Great Britain | 260—654 R |

OTHER REFERENCES

Hemmingson et al.: J. Chem. Soc. (England) (7), B, pp. 1347–52 (1971).

LEON ZITVER, Primary Examiner

J. A. BOSKA, Assistant Examiner

U.S. Cl. X.R.

252—429 R